April 2, 1968 J. P. LABRECQUE 3,375,999
AUTOMATICALLY RELEASABLE AND REENGAGEABLE AIRCRAFT
WHEEL ANTI-SWIVELLING LOCK MECHANISM
Filed April 6, 1966 3 Sheets-Sheet 1
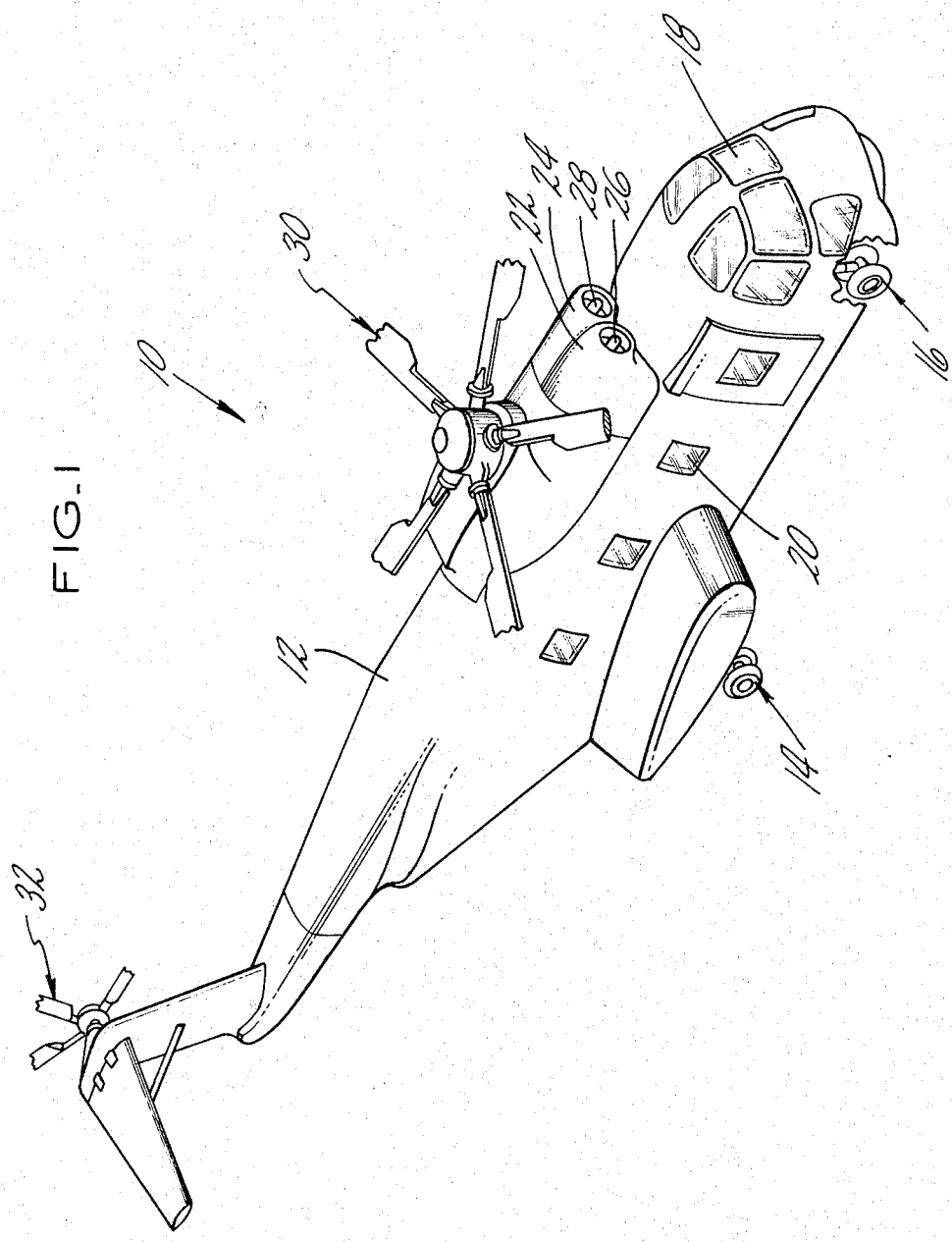
INVENTOR
JEAN P. LABRECQUE
BY Vernon F. Hauschild
ATTORNEY

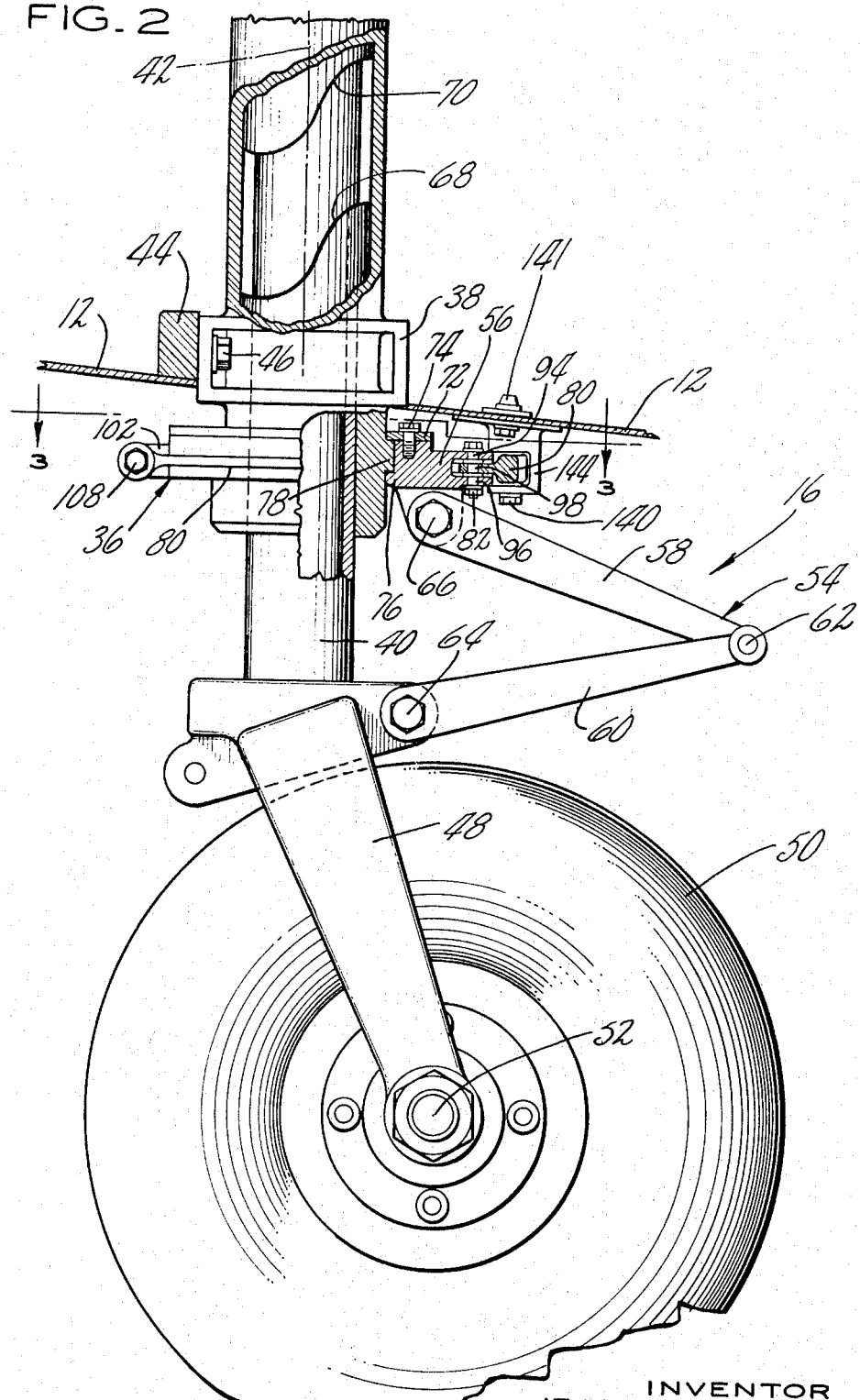

April 2, 1968     J. P. LABRECQUE     3,375,999
AUTOMATICALLY RELEASABLE AND REENGAGEABLE AIRCRAFT
WHEEL ANTI-SWIVELLING LOCK MECHANISM
Filed April 6, 1966     3 Sheets-Sheet 3
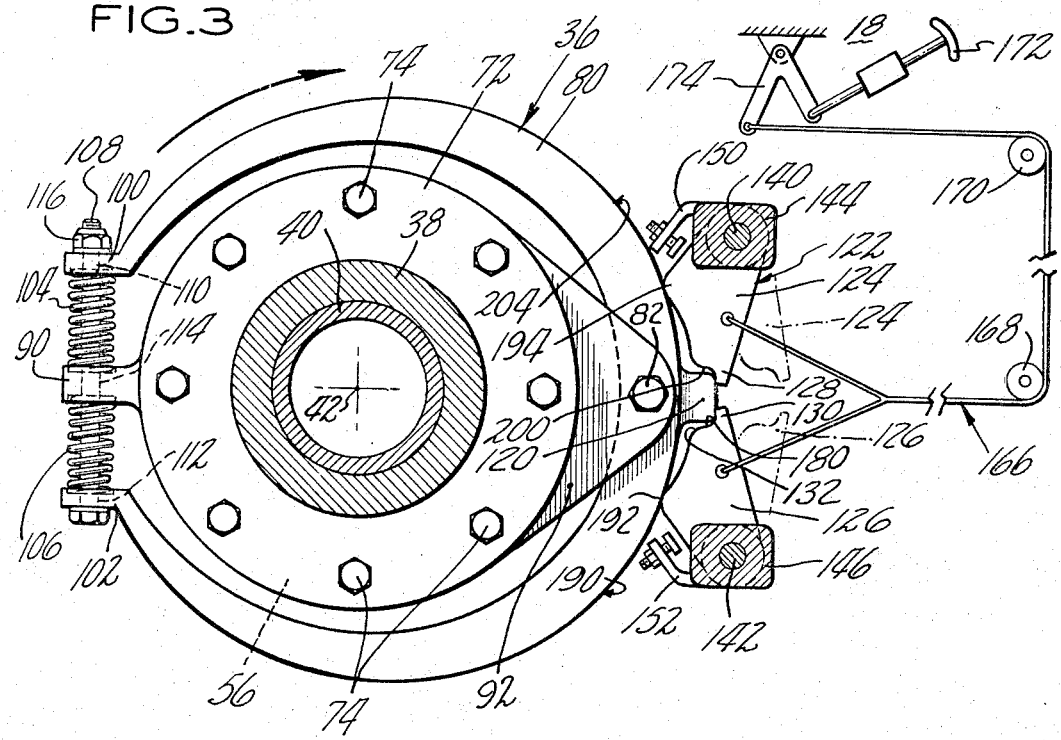
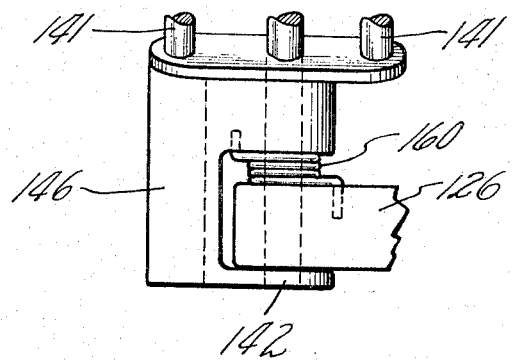
INVENTOR
JEAN P. LABRECQUE
BY Vernon F. Hauschild
ATTORNEY

United States Patent Office 3,375,999
Patented Apr. 2, 1968

3,375,999
AUTOMATICALLY RELEASABLE AND REENGAGEABLE AIRCRAFT WHEEL ANTISWIVELLING LOCK MECHANISM
Jean P. Labrecque, Stratford, Conn., assignor to United Aircraft Corporation, East Hartford, Conn., a corporation of Delaware
Filed Apr. 6, 1966, Ser. No. 540,723
18 Claims. (Cl. 244—50)

ABSTRACT OF THE DISCLOSURE

A releasable lock mechanism for a castoring wheel which includes two members which are mounted to castor with the wheel and which are movably connected to each other and which carry a projection receivable in a moveable detent so that with the projection secured in the detent the wheel is locked against castoring motion until the side load imparted to the wheel is sufficient to cause the two members to move relative to one another and thereby force the detent mechanism out of engagement with the projection to thereby free the wheel for castoring motion.

---

This invention relates to aircraft landing gear and more particularly to a releasable lock mechanism for the steering wheel of a tricycle landing gear.

In a tricycle landing gear system for an aircraft, it is desirable to lock the steering wheel against swivelling or castoring under certain conditions. For example, when the steering wheel is the tail wheel, it is desirable that the wheel be locked when the aircraft is parked as well as when the aircraft is landing or taking off. If the steering wheel is the nose wheel, it is desirable that it be locked while the aircraft is parked only.

To avoid damage to aircraft parts, it is highly desirable that the wheel lock be released whenever side, swivelling or castoring loads are applied thereto in excess of a predetermined force. This extreme wheel side loading could be caused by heavy wind conditions, or by maneuver motions of the airplane which is towed or taxied while the wheel remains locked due to inadvertence.

In the past, shear pins have been used to perform this wheel locking function, however, shear pins have proven to be unsatisfactory because damage is often caused to aircraft parts prior to shear pin failure, and also because the replacement of a sheared shear pin often presents substantial problems. A typical shear pin wheel lock construction is shown in U.S. Patent No. 2,384,054. In addition, the shear pin construction presents the disadvantage that the landing wheel cannot be relocked until the sheared shear pin has been replaced.

It is an object of this invention to teach a lock for the steering wheel of an aircraft, which lock will be released when the side, swivelling or castoring load on the locked wheel exceeds a predetermined limit, and which lock will automatically relock itself.

It is a further object of this invention to teach such an aircraft wheel lock, wherein the pilot may disengage the lock from the pilot compartment.

It is still a further object of this invention to teach such an aircraft wheel lock wherein substantial load sensing is experienced in the release mechanism whenever a side loading on the locked wheel occurs at a predetermined setting, thereby avoiding damage to aircraft parts.

It is an object of this invention to teach a wheel lock for a swivellable or castorable aircraft landing wheel which includes a lock release mechanism comprising a ring members mounted to rotate with the wheel in swivelling motion and which also includes a partial ring member partially enveloping the ring member and pivotally attached thereto and which further includes positioning springs to center the position of the partial ring member with respect to the ring member, which lock release mechanism is actuated to unlock the wheel when the wheel side loading exceeds the force of the positioning spring and thereby causes the partial ring member to pivot with respect to the ring member.

It is still a further object of this invention to teach a releasable lock for an aircraft landing gear, which lock includes a projection extending from release mechanism mounted to swivel with the wheel, and a detent or recess mechanism which engages the projection to lock the wheel and which detent mechanism includes a positive stop system, a spring biasing system toward the lock position and a cammed surface against which the projection will bear to displace the detent mechanism temporarily and thereby permit the wheel to be relocked automatically as the projection is again received in the detent mechanism.

Other objects and advantages will be apparent from the specification and claims and from the accompanying drawings which illustrate an embodiment of the invention.

FIG. 1 is a showing of a modern aircraft utilizing tricycle landing gear, and which is partially broken away to illustrate the position of the nose steering landing wheel.

FIG. 2 is a side view of an aircraft steering landing wheel showing my releasable wheel lock mechanism and which is partially broken away and partially in section to better illustrate the mechanism.

FIG. 3 is a view taken along line 3—3 of FIG 2.

FIG. 4 is a rear view showing of a portion of the detent-forming mechanism of my releasable wheel lock and which illustrates the preferable location of the biasing springs.

Referring to FIG 1, we see modern aircraft 10 which includes fuselage 12 supported by tricycle landing gear system 14. Fuselage 12 is partially broken away to illustrate the location of the steering landing gear 16, which in the embodiment shown in FIG 1 is the nose wheel but could as well have been the tail wheel. Fuselage 12 defines pilot compartment 18 and passenger or cargo compartment 20 and serves to support the pods 22 and 24 which envelope engines 26 and 28. Engines 26 and 28 provide the power to drive lift rotor 30 and tail rotor 32, both of which are of conventional design but, for purposes of illustration, are shown with foreshortened blades. Aircraft 10 may be of the type more fully disclosed and described in U.S. Patent No. 2,925,130, to which reference may be made.

Referring to FIG. 2, we see my releasable wheel lock mechanism 36 attached to fuselage 12. It will be noted that double tire wheels are shown in FIG. 1 while, for purposes of better illustration, a single tire wheel is shown in FIG. 2 but it will be apparent that my releasable lock mechanism 36 is equally applicable to either construction.

As best shown in FIG. 2, steering landing gear 16 includes a fixed housing 38 which receives and supports shaft 40 for swivelling or castoring motion about swivelling or castoring axis 42.

Housing 38 is attached to flange 44 of fuselage 12 by any convenient means such as bolt mechanism 46. Shaft 40 is connected through fork-shaped attachment mechanism 48 to the axis of wheel 50 to permit wheel 50 to rotate about its axis 52 when the aircraft is traveling on the ground. Torque scissors 54 connect wheel 50 and attachment means 48 to ring member 56 of my releasable wheel lock 36. Scissors 54 include torque arms 58 and 60 which are pivotally connected to one another at pivot point 62. Arm 60 is pivotally connected to attachment means 48 at pivot point 64 and arm 58 is pivotally connected to ring member 56 at pivot point 66. With this construction of torque scissors 54, it will be noted that the swivelling torque of wheel 50 is transmitted directly to ring member 56 of my releasable lock mechanism 36 and that shaft 40 is permitted to telescope within fixed housing 38 as well as swivel therewithin about axis 42. During landing operation, as shaft 40 telescopes into housing 38, mating cam surface 68 of housing 38 and mating cam surface 70 of shaft 40 are disengaged so that wheel 50 may swivel or castor about axis 42. Conversely as shaft 40 telescopes out of housing 38 in aircraft flight, mating cam surfaces 68 and 70 coact to bring wheel 50 into a selected position, usually centered fore-and-aft.

Referring to FIGS. 2 and 3 we see my releasable wheel lock mechanism 36 in greater particularity. It will be noted that ring member 56 is attached to ring-spaced plate 72 by bolts 74 so that plate member 72 and inner lip 76 of ring member 56 engage circumferential projection 78 of fixed housing 38 in support bearing fashion. It will be apparent that ring member 72 and partial ring member 80, which is pivotally attached to ring member 56 by bolt arrangement 82, and which partially envelopes ring member 56 as best shown in FIG. 3, may swivel about axis 42 with wheel 50 due to the connection therebetween through scissors 54.

By viewing FIG. 3, it will be noted that projection or lug 90 projects radially from one side of ring member 56 and projection 92 extends radially from the other side. Projection 92 has aligned apertures 94 and 96 (FIG. 2) which align with aperture 98 of partial ring member 80 to receive pivot bolt mechanism 82 which thereby pivotally connected ring member 56 to partial ring member 80. It will be noted that pivotal connection 82 is substantially 180° from lug 90. Partial ring member or locking ring segment 80 includes lugs 100 and 102 which are spaced from projection 90 and receive balanced restraining springs 104 and 106 therebetween to thereby centrally position partial ring member 80 with respect to ring member 56 about pivot connection 82. Bolt means 108 extends through aligned holes 110 and 112 of lugs 100 and 102 and hole 114 of lug 90 and also through springs 104 and 106 so that the springs are positioned in series on opposite sides of lug 90 with each spring extending between lug 90 and one of the lugs 100 and 102. The amount of compression in springs 104 and 106 may be adjusted by adding shims or spacers (not shown) between the springs and lugs, thereby establishing the restraining force of springs 104 and 106 which must be overcome to pivot partial ring member 80 with respect to ring member 56 about pivot connection 82. While coil springs are shown, any resilient devices such as Belleville type washers or Bungee cord may be used.

Member 80 has projection or tab 120 projecting from the circumference thereof adjacent connecting means 82. Locking assembly 122 includes two pivotal locking arms 124 and 126 which are pivotally connected to fuselage 12 about pivot bolts 140 and 142, as best shown in FIG. 4. Actually, pivot bolts 140 and 142 extend through housings 144 and 146, which are fixed to fuselage 12 by bolt assemblies 141. Each of locking arms 124 and 126 includes an end portion 128 and 130, which cooperate to form a detent or recess 132 when arms or levers 124 and 126 are in their FIG. 3 locking position wherein projection 120 is received and locked in detent 132. Since projection 120 is part of member 80, which member 80 is in turn connected to ring member 56, which is in turn connected through torque scissors 54 to wheel 50, it will be seen that when projection 120 is locked in detent 132, wheel 50 is locked in position against swivelling. Adjustable positive stop members 150 and 152 extend from fixed housings 144 and 146 and serve to positively limit the movement of lever arms 124 and 126 toward ring members 56 and 80. As best shown in FIG. 4, a biasing spring 160 extends between housing 146 and locking arm 126 to bias locking arm 126 to its FIG. 3 locked position. A similar biasing spring extends between fixed housing 144 and locking arm 124 to similarly bias arm 124.

As best shown in FIG. 3, cable mechanism 166 attaches to locking arms 124 and 126 and passes around pulleys 168 and 170 and extends into the pilot compartment 18 where it connects to pilot-operated lock handle 172 through pivotable bell crank 174. It will be noted that when the pilot wishes to lock landing gear mechanism 16, against swivelling, he may do so by pulling on lock handle 172 to release cable mechanism 166 and permit the biasing springs such as 160 to move locking arms 124 and 126 into our FIG. 3 locked position about projection 120. If the pilot wishes to unlock the locking gear mechanism 16, he will depress lock handle 172 to cause cable mechanism 166 to retract locking arms 124 and 126 to the unlocked position shown in phantom in FIG. 3, thereby freeing projection 120 and hence ring members 56 and 80 and wheel 50 for swivelling or castoring motions about swivelling axis 42.

As previously stated, it is an important feature of my wheel locking mechanism 36 that the wheel will automatically be unlocked when the side load applied to wheel 50 exceeds a prede termined limit, which predetermined limit is reflected in the restraining force of springs 104 and 106. This preselected force is chosen to be of such value that this force is exceeded before locking mechanism 36 or any of its associated parts are damaged. This preselected force is usually exceeded only when the airplane is subjected to severe windage conditions when parked, or when the parked airplane is attempted to be hauled or taxied with the steering wheel lock inadvertently engaged. It is also important that my locking mechanism 36 will relock automatically.

The automatic unlocking and relocking feature of my wheel lock mechanism 36 can best be explained by viewing FIG. 3. For purposes of illustration, assume that a side or swivelling force is applied to wheel 50 in such a direction as to attempt to move shaft 40 and hence ring member 56 and partial ring member 80 in a clockwise direction as indicated by the arrow. This attempted clockwise motion will cause projection 120 to bear against surface 180 of end portion 130 of locking arm 126. When this side load exceeds the restraining force of spring 104, projection 120 and ring member 80 will commence to pivot in a counterclockwise direction about bolt mechanism 82 thereby compressing spring 104 and permitting lug 100 of member 80 to move toward lug 90 of ring member 56. This relative pivotal motion between members 56 and 80 about bolt mechanism 82 will cause surface 190 of member 80 to bear against cammed surface 192 of locking arm 126, thereby causing locking arm 126 to move in a clockwise direction about pivot bolt 142 toward its unlocked phantom position, thereby freeing projection 120 and hence wheel 50 to swivel in a clockwise direction. As wheel 50 approaches the completion of a revolution about swivelling axis 42 in a clockwise direction, projection 120 then bears against cammed surface 194 of locking arm 124 to move locking arm 124 toward its phantom or unlocked position, permitting projection 120 to pass thereby and again engage recess 132, formed by locking arms 124 and 126, which have been returned to their FIG. 3, locked position by the biasing springs such as 160. Wheel locking mechanism 36 is again in its locked position.

If the clockwise swivelling loads on wheel 50 still exceeds the force of restraining spring 104 the wheel release operation will occur again.

Had the side loading imposed upon wheel 50 been in the opposite direction so as to attempt to move shaft 40 and hence members 56 and 80 in the counterclockwise direction, projection 120 would have contacted surface 200, and spring 106 would be compressed to permit members 80 and 56 to pivot relative to one another in opposite directions and thereby cause surface 204 of member 80 to bear against cam surface 194 of locking arm 124 and move that locking arm toward its phantom or unlocked FIG. 3 position, thereby freeing projection 120, and hence members 80 and 56 and wheel 50 to swivel in a counterclockwise direction about swivel axis 42. As wheel 50 approaches the completion of its counterclockwise swivelling revolution, projection 120 will bear against cam surface 192 of locking lever 126 to pivot lever 126 toward its FIG. 3 phantom or unlocked position, thereby permitting projection 120 to again be received in recess 132 and locking wheel 50 in position.

As best shown in FIGS. 2 and 3, it will be noted that the distance or moment arm between bolt mechanism 82 and projection 120 is quite small in comparison to the distance or moment arm between bolt mechanism 82 and springs 104 and 106, thereby allowing a small force of spring 104 or 106 to restrain a large force on projection 120 as member 80 attempts to pivot about bolt mechanism 82 in response to wheel sideloading.

It is to be understood that the invention is not limited to the specific embodiment herein illustrated and described but may be used in other ways without departure from its spirit as defined by the following claims.

I claim:
1. In an aircraft,
   (a) a wheel mounted for castoring motion,
   (b) a lock to prevent wheel castoring comprising a first member mounted to move with said wheel in castoring motion,
   (c) a second member movably connected to said first member and having a projection extending therefrom,
   (d) detent defining means mounted for movement between a first position wherein said projection is located in said detent means to lock said projection in position so that said first and second members and said wheel are locked to prevent castoring motion and a second postion wherein said projection is free of said detent means so that said first and second members and said wheel are free to move in castoring motion,
   (e) and spring means restraining said second member in position so that when said detent means is in said first position and a wheel castoring force is applied sufficient to overcome the restraining force of said spring means, said second member will be moved relative to said first member to bear against said detent means and move said detent means to said second position and thereby free said wheel for castoring.
2. In an aircraft,
   (a) a wheel mounted for castoring motion,
   (b) a lock to prevent wheel castoring comprising a first member mounted to move said wheel in castoring motion,
   (c) a second member mounted to move with said wheel in castoring motion and pivotally connected to said first member and having a projection extending therefrom,
   (d) detent defining means mounted for movement between a first position wherein said projection is located in said detent means to lock said projection in position so that said first and second members and said wheel are locked to prevent castoring motion and a second position wherein said projection is free of said detent means so that said first and second members and said wheel are free to move in castoring motion,
   (e) and spring means restraining said second member in position so that when said detent means are in said first position and a wheel castoring force is applied sufficient to overcome the restraining force of said spring means, said second member will pivot relative to said first member to bear against said detent means and move said detent means to said second position and thereby free said wheel for castoring.
3. In an aircraft,
   (a) a wheel mounted for castoring motion,
   (b) a lock to prevent wheel castoring comprising a ring member mounted to move with said wheel in castoring motion and having a first projection extending from the periphery thereof, and a second projection extending from the periphery thereof,
   (c) a partial ring member partially enveloping said ring member and mounted to move with said wheel in castoring motion and pivotally connected to said first projection of said ring member and having a projection extending therefrom adqacent said pivotal connection and further having two ends positioned on opposite sides of said second projection,
   (d) detent defining means mounted for movement between a first position wherein said partial ring member projection is located in said detent means to lock said partial ring member projection in position so that said ring and partial ring members and said wheel are locked to prevent castoring motion and a second position wherein said partial ring member projection is free of said detent means so that said ring and partial ring members and said wheel are free to move in castoring motion,
   (e) and spring means extending between said second projection of said ring member and said two ends of said partial ring member to restrain said partial ring member in position with respect to said ring member about the pivotal connection therebetween so that when said detent means are in said first position and a wheel castoring force is applied sufficient to overcome the restraining force of said spring means, said projection of said partial ring member will bear against said detent means to cause said partial ring member to pivot about said pivotal connection relative to said first member and to bear against said detent means and move said detent means to said second position and thereby free said wheel for castoring.
4. Apparatus according to claim 3 wherein said first and second projections from said ring member are substantially diametrically opposed.
5. Apparatus according to claim 3 and wherein the distance between said partial ring member projection and said pivotal connection between said ring and said partial ring members is small in comparison to the distance between said spring means and said pivotal connection between said ring and said partial ring members.
6. Apparatus according to claim 5 and including biasing spring means connected to biased said detent defining means into said first position, and positive stop means to limit the movement of said detent defining means towards said ring and partial ring members, and further including manually operable means connected to overcome said biasing spring means and to move said detent defining means to said second position.
7. Apparatus according to claim 3 and wherein said detent defining means comprises first and second pivotal arms having cooperating end portions defining a detent to receive said partial ring member projection when said detent defining means is in said first position and with the first of said arms including a cammed surface positioned to be intercepted by said partial ring member projection to thereby move said first arm into said second position until said partial ring member projection abuts said end projection of said second arm, whereupon said biasing spring will move said first arm back to said first position to relock said partial ring member projection in said detent.
8. In combination,
   (a) an aircraft having a fuselage,

(b) an aircraft wheel mounted in said fuselage for castoring motion, (c) a lock to prevent wheel castoring comprising a ring member mounted to move with said wheel in castoring motion and having a first projection extending from a periphery thereof and a second projection extending from the periphery thereof, (d) a partial ring member partially enveloping said ring member and mounted to move with said wheel in castoring motion and pivotally connected to said first projection of said ring member and having a projection extending therefrom adjacent said pivotal connection, and further having two lugs positioned on opposite sides of said second projection, (e) detent defining means mounted for movement between a first position wherein said partial ring member projection is located in said detent means to lock said partial ring member porjection in position so that said ring and partial ring members and said wheel are locked to prevent castoring motion and a second position wherein said partial ring member projection is free of said detent means so that said ring and partial ring members and said wheel are free to move in castoring motion, and spring means extending between said second projection of said ring member and said two lugs of said partial ring to restrain said partial ring member in position with respect to said ring member about the pivotal connection therebetween so that when said detent means are in said first position and a wheel castoring force is applied sufficient to overcome the restraining force of said spring means, said projection of said partial ring member will bear against said detent means to cause said partial ring member to pivot about said pivotal connection relative to said first member to bear against said detent means and move said detent means to said second position and thereby free said wheel for castoring.

9. In an aircraft landing gear,
(a) a fixed housing,
(b) a shaft member supported by said housing for rotation about a swivelling axis,
(c) an aircraft wheel,
(d) means connecting said shaft to said wheel so that said shaft wheel will rotate in swivelling motion together about said swivelling axis,
(e) a first member connected to and mounted to rotate in swivelling motion with said shaft and wheel,
(f) a second member pivotally connected to said first member and including attachment means,
(g) recess forming means mounted to be movable between a first position wherein the recess of said recess means engages said attachment means of said second member to lock said first and second members, said shaft and said wheel against swivelling motion and a second position wherein the recess is free of the attachment means,
(h) spring means acting on said second member so that, when the swivelling force applied to said wheel exceeds the force of said spring member, said second member will move relative to said first member and bear against said recess forming means to move said recess forming means to said second position, thereby freeing said members, said shaft and said wheel for swivelling motion.

10. In an aircraft landing gear,
(a) a fixed housing,
(b) a shaft member supported by said housing for rotation about a swivelling axis,
(c) an aircraft wheel,
(d) means connecting said shaft to said wheel so that said shaft and wheel will rotate in swivelling motion together about said swivelling axis,
(e) a first member connected to and mounted to rotate in swivelling motion with said shaft and wheel,
(f) a second member pivotally connected to said first member and including first cooperating attachment means,
(g) second cooperating attachment means mounted to be movable between a first position wherein said second cooperating attachment means engages said first cooperating attachment means of said second member to lock said first and second members, said shaft and said wheel against swivelling motion, and a second position wherein said second cooperating attachment means is free of said first cooperating attachment means,
(h) spring means acting on said second member so that, when the swivelling force applied to said wheel exceeds the force of said spring member, said second member will move relative to said first member and bear against said second cooperating attachment means to move said second cooperating attachment means to said second position thereby freeing said members, said shaft and said wheel for swivelling motion.

11. Apparatus according to claim 10 and including second spring means biasing said second cooperating attachment means towards said first position.

12. Apparatus according to claim 11 and including positive stop means limiting the movement of said second cooperating attachment means toward said first position.

13. Apparatus according to claim 11 and including manually operable means to move said second cooperating attachment means from said first position to said second position.

14. In an aircraft landing gear,
(a) a fixed housing,
(b) a shaft member supported by said housing for rotation about a swivelling axis,
(c) an aircraft wheel,
(d) means connecting said shaft to said wheel so that said shaft and wheel will move in swivelling motion together about said swivelling axis,
(e) a ring member connected to and mounted to move in swivelling motion with said shaft and wheel and having a projection extending circumferentially therefrom,
(f) a partial ring member mounted to move in swivelling motion with said shaft and partially enveloping said ring member and including first cooperating attachment means and further having two ends positioned on opposite sides of said projection,
(g) means pivotally connecting said ring member to said partial ring member adjacent said first cooperating attachment means,
(h) second cooperating attachment means mounted to be movable between a first position wherein said second cooperating attachment means engages said first cooperating attachment means of said second member to lock said first and second members, said shaft and said wheel against swivelling motion, and a second position wherein said second cooperating attachment means is free of said first cooperating attachment means,
(i) spring means extending between said projection of said ring member and said ends of said partial ring member to position said partial ring member with respect to said ring member about said pivotal connecting means so that, when the swivelling force applied to said wheel exceeds the force of said spring member, said partial ring member will pivot relative to said ring member and bear against said second cooperating attachment means to move said second cooperating attachment means to said second position thereby freeing said members, said shaft and said wheel for swivelling motion.

15. In combination,
(a) an aircraft having a fuselage,
(b) a fixed housing attached to and supported by said fuselage,
(c) a shaft member supported by said housing for rotation about a swivelling axis,
(d) an aircraft wheel,
(e) means connecting said shaft to said wheel so that said shaft and wheel will move in swivelling motion together about said swivelling axis,
(f) a ring member connected to and mounted to move in swivelling motion with said shaft and wheel and having a projection extending circumferentially therefrom,
(g) a partial ring member mounted to move in swivelling motion with said shaft and partially enveloping said ring member and including first cooperating attachment means and further having two ends positioned on opposite sides of said projection,
(h) means pivotally connecting said ring member and said partial ring member adjacent said first cooperating attachment means,
(i) second cooperating attachment means mounted to be movable between a first position wherein said second cooperating attachment means engages said first cooperating attachment means of said second member to lock said first and second members, said shaft and said wheel against swivelling motion and a second position wherein said second cooperating attachment means is free of said first cooperating attachment means,
(j) spring means extending between said projection of said ring member and said ends of said partial ring member to centrally position said partial ring member with respect to said ring member about said pivotal connecting means so that, when the swivelling force applied to said wheel exceeds the force of said spring member, said partial ring member will pivot relative to said ring member and bear against said second cooperating attachment means to move said second cooperating attachment means to said second position thereby freeing said members, said shaft and said wheel for swivelling motion.

16. In combination,
(a) an aircraft having a fuselage,
(b) a fixed housing attached to and supported by said fuselage,
(c) a shaft member supported by said housing for rotation about a swivelling axis,
(d) an aircraft wheel,
(e) means connecting said shaft to said wheel so that said shaft and wheel will move in swivelling motion together about said swivelling axis,
(f) a ring member connected to and mounted to move in swivelling motion with said shaft and wheel and having a projection extending circumferentially therefrom,
(g) a locking ring element mounted to move in swivelling motion with said shaft and partially enveloping said ring member and including first cooperating attachment means and further having two ends positioned on opposite sides of said projection,
(h) means pivotally connecting said ring member and said locking ring element adjacent said first cooperating attachment means,
(i) second cooperating attachment means mounted to be movable between a first position wherein said second cooperating attachment means engages said first cooperating attachment means of said locking ring element to lock said ring member and said locking ring element, said shaft and said wheel against swivelling motion and a second position wherein said second cooperating attachment means is free of said first cooperating attachment means,
(j) preloaded spring means extending between said projection of said ring member and said ends of said locking ring element to centrally position said locking ring element with respect to said ring member about said pivotal connecting means so that, when the swivelling force applied to said wheel exceeds the force of said spring member, said locking ring element will pivot relative to said ring member and bear against said second cooperating attachment means to move said second cooperating attachment means to said second position thereby freeing said ring member and said locking ring element, said shaft and said wheel for swivelling motion,
(k) manually operable means connected to move said second cooperating attachment means from said first to said second position,
(l) and adjustable positive stop means to limit the movement of said second cooperative attachment means toward said locking ring element.

17. In an aircraft landing gear,
(a) an aircraft wheel mounted for swivelling rotation,
(b) a first member mounted to rotate with said wheel in swivelling motion,
(c) a second member pivotally connected to said first member and mounted to rotate with said wheel in swivelling motion,
(d) and locking means adapted to move to a first position wherein it engages and locks one of said members and a second position wherein said members may rotate in swivelling motion with said wheel free of said locking means.

18. Apparatus according to claim 17 wherein said locking means is moved from said first to said second position as said second member pivots relative to said first member.

References Cited
UNITED STATES PATENTS
| | | | |
|---|---|---|---|
| 2,560,726 | 7/1951 | Jones et al. | 16—35 X |
| 2,583,858 | 1/1952 | Kostolecki | 16—35 |
| 3,006,579 | 10/1961 | Frederick | 244—50 |

MILTON BUCHLER, *Primary Examiner.*

B. BELKIN, *Assistant Examiner.*